United States Patent Office 3,384,641
Patented May 21, 1968

3,384,641
2-METHYLENE-3-QUINUCLIDONES
John H. Biel and Harvey B. Hopps, Milwaukee, Wis., and Henryk Bader, Newton Center, Mass., assignors to Aldrich Chemical Co., Inc., Milwaukee, Wis., a corporation of Wisconsin
No Drawing. Continuation-in-part of application Ser. No. 426,360, Jan. 18, 1965. This application Sept. 19, 1967, Ser. No. 668,941
3 Claims. (Cl. 260—294.7)

ABSTRACT OF THE DISCLOSURE

Chemical compounds, namely the free base and acid addition salts of 2-methylene-3-quinuclidinone of the following structure:

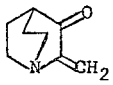

which are useful in separating mixtures of primary and secondary amines in a quantitative manner as well as purifying various amines.

---

This invention relates to novel compounds and to processes of producing such compounds. More particularly, this invention relates to novel 2-methylene-3-quinuclidinones.

This application is a continuation-in-part of our application, Ser. No. 426,360, filed Jan. 18, 1965, now abandoned.

DESCRIPTION 2-methylene-3-quinuclidinone is produced in a Mannich reaction by reacting 3-quinuclidinone with an aqueous solution of dimethylamine and formaldehyde in a suitable solvent such as methanol, ethanol or isopropanol at elevated temperatures. After removal of the solvent, the 2-methylene-3-quinuclidinone is obtained in almost quantitative yield by pyrolysis of the intermediate 2-dimethylamino-3-quinuclidinone and distillation of the resulting 2-methylene-3-quinuclidinone. This reaction may be represented schematically as follows:

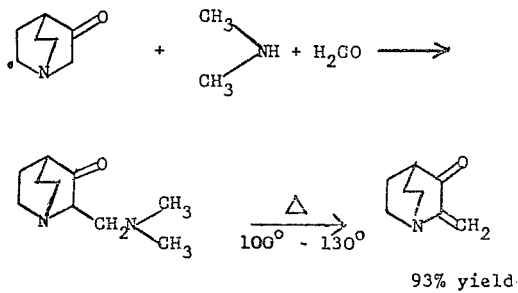

93% yield

In place of dimethylamine, other low boiling amines may be employed such as methylamine, ethylamine, diethylamine, allylamine, N-methylallylamine, N-methylbenzylamine, N-methylcyclohexylamine, pyrrolidine, piperidine and morpholine.

Acid addition salts of 2-methylene-3-quinuclidinone are produced by contacting the free base with a suitable mineral or organic acid such as sulfuric acid, hydrochloric acid, phosphoric acid, formic acid, citric acid, maleic acid, methanesulfonic acid and cyclohexanesulfonic acid.

2-methylene-3-quinuclidinone is a highly reactive compound which is capable of reacting in a quantitative manner with a variety of primary and secondary amines such as dimethylamine, diethylamine, morpholine, pyrrolidine and piperidine. Upon heating in an oil bath at elevated temperatures, the primary or secondary amine is released and may be recovered by distillation. Thus the compound of this invention may be employed to free primary or secondary amines from neutral, acid or tertiary amine impurities. This same mechanism may be utilized for the separation of primary, secondary and tertiary amines from mixtures of the three types. This use is illustrated as follows:

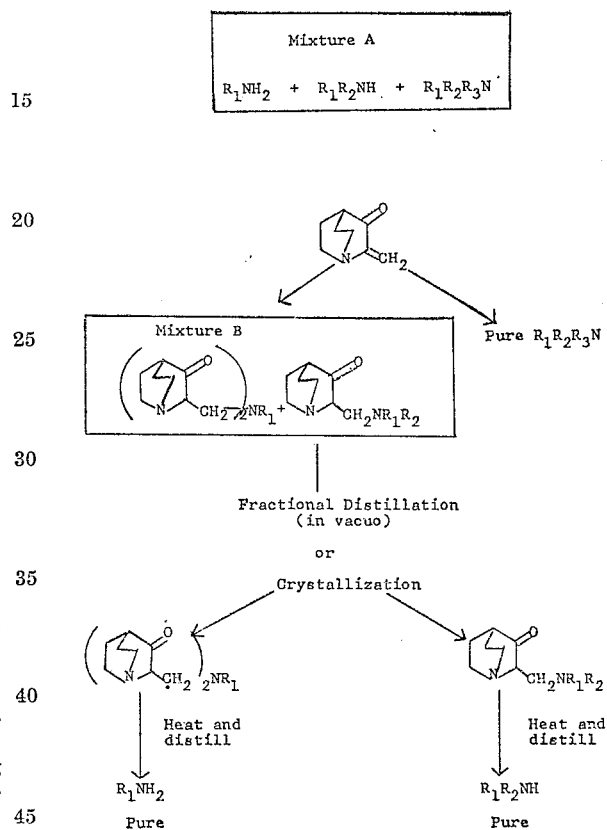

$R_1$, $R_2$ and $R_3$ each represent lower alkyl groups or $R_1$ and $R_2$ when taken together with each other and the nitrogen atom form a heterocyclic ring such as piperidine, pyrrolidine and morpholine.

Other uses of 2-methylene-3-quinuclidinone include its action as a buffering agent to neutralize acid solution, thus eliminating metallic corrosion. This compound also has chelating properties and may be used for the recovery of trace metals such as cobalt. The compound finds still further use in the isolation of penicillin from fermentation broths.

The products of the invention are more conveniently stored in the form of the acid addition salts which are prepared as described above. This is because 2-methylene-3-quinuclidinone tends to polymerize on long standing on the shelf. Any of the acid addition salts, however, may be kept for long periods of time without any polymerization or other deterioration. The free base may always be generated by reacting any of the salts with an appropriate base such as sodium carbonate.

The invention will now be illustrated by, but is not intended to be limited to, the following examples:

Example 1.—2-methylene-3-quinuclidinone

A. A solution of 200 g. (1.6 M) of 3-quinuclidinone, 270 g. (2.4 M) of 40% aqueous dimethylamine solution, 194.8 g. (2.4 M) of 37% aqueous formaldehyde solution and 250 ml. of ethanol and 100 ml. more of water was stirred at reflux for 1.0 hr., then at 70° for 17 hrs. and allowed to cool to room temperature. The solvents and excess reagents were evaporated in vacuo and the oily residue fractionally distilled to provide 203 g. (92.5%) of 2-methylene-3-quinuclidinone as a slightly yellow oil; B.P. 91–92° C./7 mm.; $n_D^{20}$ 1.5110.

The infrared spectrum showed the ketone band at 5.85μ and the methylene band at 6.1μ. A vapor phase chromatogram on alkaline Carbowax at a column temperature of 115° showed the presence of one component at 12.5 min.; at a column temperature of 150°, again only one component was detected at 3.0 min. An elemental analysis sample was prepared by redistillation; B.P. 91–92° C./7 mm.

*Analysis.*—Calcd. for $C_8H_{11}NO$ (137.18): C, 70.04; H, 8.08; N, 10.21. Found: C, 69.01; H, 8.07; N, 10.22.

B. A solution of 200 g. (1.6 M) of 3-quinuclidinone, 440 g. (2.4 M) of 40% aqueous diethylamine solution, 194.8 g. (2.4 M) of 37% aqueous formaldehyde solution and 250 ml. of ethanol and 100 ml. more of water was stirred at reflux for 1.0 hr., then at 70° for 17 hrs. and allowed to cool to room temperature. The solvents and excess reagents were evaporated in vacuo and the oily residue fractionally distilled to provide 204 g. (93%) of 2-methylene-3-quinuclidinone as a slightly yellow oil; B.P. 98–100° C./5 mm.

The infrared spectrum showed the ketone band at 5.85μ and the methylene band at 6.1μ. A vapor phase chromatogram on alkaline Carbowax at a column temperature of 115° showed the presence of one component at 12.5 min.; at a column temperature of 150°, again only one component was detected at 3.0 min.

C. A solution of 200 g. (1.6 M) of 3-quinuclidinone, 93 g. (1.2 M) of 40% aqueous methylamine solution, 194.8 g. (2.4 M) of 37% aqueous formaldehyde solution and 250 ml. of ethanol and 100 ml. more of water was stirred at reflux for 1.0 hr., then at 70° for 17 hrs. and allowed to cool to room temperature. The solvents and excess reagents were evaporated in vacuo and the residue fractionally distilled to provide 203 g. (92.5%) of 2-methylene-3-quinuclidinone as a slightly yellow oil; B.P. 91–92° C./7 mm.

Example 2.—2-methylene-3-quinuclidinone hydrochloride

The hydrochloride salt of Example 1 was prepared in water: ethanol (1:1) by the addition of an equivalent of concentrated hydrochloric acid and was recrystallized from water to give a 90% yield of the hydrochloride dihydrate as white micro prisms; M.P. 284–288° C. (dec.). The infrared spectrum showed a band at 3.1μ and very weak bands at 5.8 and 6.13μ.

The following example illustrates the use of 2-methylene-3-quinuclidinone to separate a mixture of a secondary and tertiary amine into the components.

Example 3.—Separation of a mixture of pyridine and piperidine

A mixture containing equal parts of pyridine and piperidine was placed into methanol and added to a methanolic solution of 2-methylene-3-quinuclidinone without external heating. The reaction mixture was then stripped of methanol and the residual oil subjected to fractional distillation:

Fraction 1: B.P. 30–35° C./40 mm. This fraction was pure pyridine.

Fraction 2: B.P. 85–90° C./200 mm. Oil bath temperature was 120° C. This fraction was pure piperidine.

Fraction 3: B.P. 91–92° C./7 mm. This fraction was pure 2-methylene-3-quinuclidinone.

The following example illustrates the use of 2-methylene-3-quinuclidine to purify a primary amine.

Example 4.—Production of methylamine

A solution of 13.7 g. (0.1 M) of 2-methylene-3-quinuclidinone in 20 ml. of methanol was added dropwise with stirring and external cooling to 3.88 g. (0.05 M) of a 40% aqueous solution of methylamine. This mixture was heated for 1 hr. at 50° C. and then the solvent removed, leaving a solid residue which yielded on crystallization from a mixture of benzene ether 11 g. (73.3%) of α,α'-methyliminobis-(2-methyl-3-quinuclidinone) monohydrate, M.P. 90–92°, of the following structure:

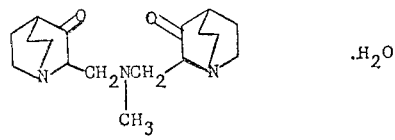

On gentle heating of the α,α'-methyliminobis-(2-methyl-3-quinuclidinone), pure gaseous methylamine was evolved and collected in a cold trap kept at −40° C. The residue consisted of pure 2-methylene-3-quinuclidinone.

Various changes and modifications of the invention can be made and, to the extent that such variations incorporate the spirit of this invention, they are intended to be included within the scope of the appended claims.

What is claimed is:

1. A compound selected from the group consisting of 2-methylene-3-quinuclidinone and acid addition salts thereof.

2. 2-methylene-3-quinuclidinone.

3. 2-methylene-3-quinuclidinone hydrochloride.

References Cited

Hansen et al.: J. Heterocyclic Chem., vol. 3 (1) (1966), p. 109.

Nielsen: J. Organic Chem., vol. 31 (4) (1966), pp. 1053–9.

JAMES A. PATTEN, *Primary Examiner.*